United States Patent [19]
Pilloff

[11] 3,872,403
[45] Mar. 18, 1975

[54] TRANSVERSE LAMINAR FLOW DYE LASER CELL
[75] Inventor: Herschel S. Pilloff, Oxon Hill, Md.
[73] Assignee: The United States of America as represented by the Secretary of the Navy, Washington, D.C.
[22] Filed: Feb. 22, 1974
[21] Appl. No.: 447,456

Related U.S. Application Data
[63] Continuation-in-part of Ser. No. 286,783, Sept. 6, 1972, abandoned.

[52] U.S. Cl.............................. 331/94.5, 356/246
[51] Int. Cl............................................ H01s 3/02
[58] Field of Search .......... 331/94.5; 356/181, 244, 356/246

[56] References Cited
UNITED STATES PATENTS
3,740,665  6/1973  Itzkan ............................... 331/94.5

Primary Examiner—William L. Sikes
Attorney, Agent, or Firm—R. S. Sciascia; Arthur L. Branning; M. L. Crane

[57] ABSTRACT

A dye laser cell for nitrogen lasers which minimizes turbulent fluid flow, and thermal lens and prism effects in the dye solution.

2 Claims, 2 Drawing Figures

TRANSVERSE LAMINAR FLOW DYE LASER CELL

CROSS REFERENCE TO RELATED APPLICATION

This application is a continuation-in-part of application Ser. No. 286,783, filed Sept. 6, 1972, now abandoned.

BACKGROUND OF THE INVENTION

This invention relates to nitrogen laser pumped dye lasers and more particularly to a structure which permits operation at repetition rates in excess of 100 pulses per second without degradation of the output beam quality.

Heretofore, nitrogen laser pumped dye lasers employed longitudinal flow schemes in which the optical beam quality was degraded due to turbulent fluid flow, and thermal lens and prism effects in the dye solution.

SUMMARY OF THE INVENTION

This invention is directed to a structure which permits laminar flow in a dye solution cell which is transverse relative to the nitrogen laser output which is incident thereon.

STATEMENT OF THE OBJECTS

It is therefore an object of the present invention to provide a dye solution cell structure which avoids problems heretofore found in dye solution lasers.

Another object is to provide a dye solution cell which permits operation at a high repetition rate in excess of 100 pulses per second.

Still another object is to provide a dye solution cell which permits operation without degradation of the output beam quality.

Other objects and advantages of the invention will become obvious to those skilled in the art upon reading the specification with reference to the attendant drawing.

DESCRIPTION OF THE APPARATUS

Figure 1:
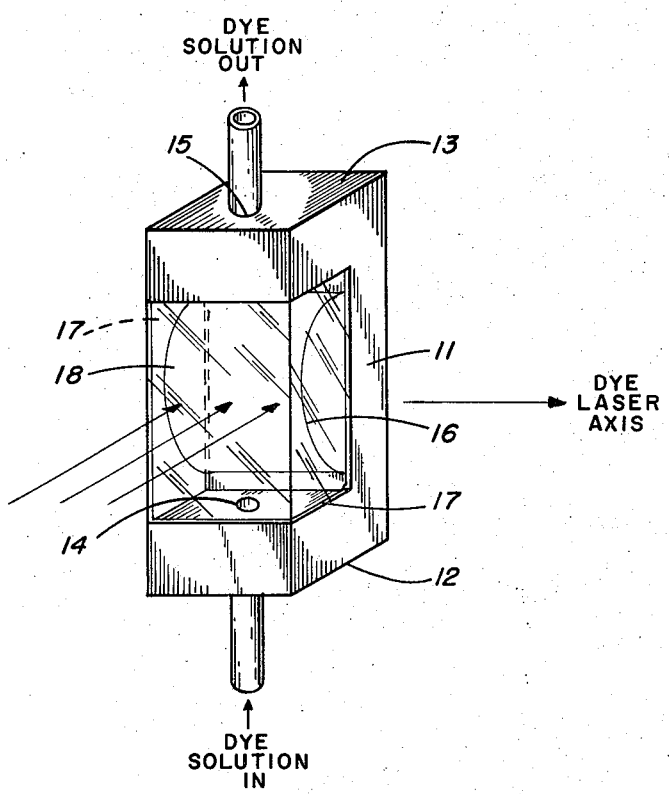
FIG. 1 illustrates a perspective view of the dye solution cell.
Figure 2:
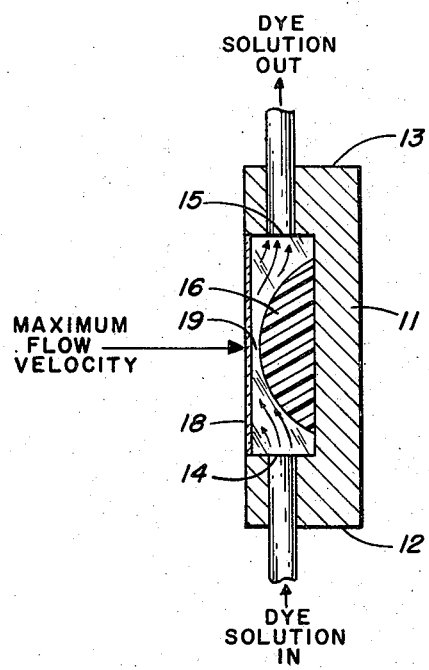
FIG. 2 illustrates a partial side view illustrating the fluid flow between the window and the structure which causes laminar fluid flow.

Now referring to the drawing, there is shown for illustrative purposes, a transverse laminar flow dye cell for a nitrogen laser. The device includes a base 11 having integral ends 12 and 13 normal to the base. The ends are provided with apertures 14 and 15 which serve as an inlet and an outlet through which a dye solution flows. A form 16 having a face 17 with a curvature similar to a section of an ellipse or portion of a circle is placed on the base such that the height at the mid-plane is about 1 millimeter less than the height of the ends from the inner surface of the base upon which the form is secured. Therefore there is a spacing between the end wall of the dye cell and the topmost part of the form 16. The device is enclosed by two side quartz windows 17 and an end quartz window 18. Therefore, the separation between the quartz end window 18 and the center plane of the form 16 is approximately one mm. A nitrogen laser output is focused onto a line along the mid-plane of the form 16 such that the light is focused along a line 0.1 mm from the window within the area between the quartz window and the form 16. In accordance with Bernoulli's law, the dye solution passing through the dye cell will have the greatest velocity at 19 as it passes through the narrowest passage between the window and the form 16. The curvature of the form 16 is such that the solution flow will be smooth and free of any turbulence.

In operation, the dye solution enters the dye cell through the input at a desired velocity. The velocity of the dye solution increases as it passes through the opening between the form 16 and the quartz window 18 until it passes through the narrowest passage. Since the form 16 is streamlined and smooth, the flow of the solution is smooth and without turbulence. The nitrogen laser output is focused along a line at the mid-plane of the form 16 where the solution flow is greatest. The $N_2$ output radiation excites the dye solution to produce an output as shown along the dye cell axis. Obviously, the dye cell cavity is provided with a fully and partially reflective mirror as is well known in assembly of laser cavities.

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A transverse laminar flow dye laser cell for the nitrogen laser, which comprises:
   a housing;
   said housing including a base with opposite ends perpendicular with said base;
   a dye solution inlet in one end,
   a dye solution output in the opposite end;
   opposite side windows secured to said base and opposite ends;
   a top window enclosing said housing;
   a somewhat elliptical form within said housing blocking off a major portion of said cell with the greatest height of said form near the top window thereby restricting the fluid flow passage between said form and said top window and forming a line parallel with said ends while preventing turbulence.

2. A dye laser cell as claimed in claim 1, wherein:
   the spacing between the uppermost part of said form and the top window being about 1 millimeter.

* * * * *